United States Patent [19]

Williams et al.

[11] 4,138,815

[45] Feb. 13, 1979

[54] CONSOLE UNIT PARTICULARLY FOR USE BY A DENTAL ASSISTANT

[75] Inventors: James A. Williams, Van Wyck, S.C.; Arthur L. Jones, Charlotte, N.C.

[73] Assignee: Pelton & Crane Company, Charlotte, N.C.

[21] Appl. No.: 741,366

[22] Filed: Nov. 12, 1976

[51] Int. Cl.[2] .......... A61C 19/02

[52] U.S. Cl. .......... 32/22; 312/209

[58] Field of Search .......... 32/22; 312/209, 202, 312/252, 306, 333

[56] References Cited

U.S. PATENT DOCUMENTS

| | | | |
|---|---|---|---|
| 2,209,294 | 7/1940 | Froelich | 312/209 |
| 2,573,115 | 10/1951 | Sisto | 312/306 |
| 3,043,290 | 7/1962 | Smith | 312/306 |
| 3,085,338 | 4/1963 | Pätzold et al. | 32/22 |
| 3,143,803 | 8/1964 | Lunn | 32/22 |
| 3,280,458 | 10/1966 | Deeley, Jr. et al. | 32/22 |
| 3,304,609 | 2/1967 | Horowitz et al. | 32/22 |
| 3,514,171 | 5/1970 | McGaha | 32/22 |
| 3,885,846 | 5/1975 | Chuang et al. | 312/306 |

*Primary Examiner*—Russell R. Kinsey
*Assistant Examiner*—John J. Wilson
*Attorney, Agent, or Firm*—Bell, Seltzer, Park & Gibson

[57] ABSTRACT

A console unit, particularly for use by a dental assistant, adapted to carry powered handpiece instruments and to provide storage space and working space utilized during the treating of a patient, is characterized by a mobile construction for easy access thereto. A main cabinet portion is provided for containing support apparatus for the powered handpiece instruments and for providing storage space. An upper work surface portion is movably carried by the main cabinet portion and has an upper generally flat working surface area thereon. A powered handpiece instrument storage compartment is secured to and suspended from one side of the upper work surface portion for movement therewith and for removably carrying a plurality of powered handpiece instruments and attached operating flexible hose for easy removal and use. Devices mount the upper work surface area for horizontal, forward and return movement for positioning of the upper work surface area and the handpiece instrument storage compartment in desired proximity to a user positioned in front of the console unit. Devices mount the upper work surface portion on the main cabinet portion for vertical upward and return movement of the upper work surface portion and the handpiece instrument storage compartment for positioning thereof at a desired elevation for easy access by the user.

22 Claims, 7 Drawing Figures

CONSOLE UNIT PARTICULARLY FOR USE BY A DENTAL ASSISTANT

This invention relates to a console unit, particularly for use by a dental assistant, which is adapted to carry powered handpiece instruments and to provide shelf, drawer, cabinet or the like storage space for miscellaneous hand tools, supplies and the like and working space utilized during the treating of a patient, and which is characterized by a mobile construction for easy access thereto.

BACKGROUND OF THE INVENTION

Numerous arrangements for dental, medical or other console units utilized in the treating of a patient have heretofore been provided and have included behind-the-patient, beside-the-patient and over-the-patient console units for use by the person or his assistant performing treatment on a patient, which may be positioned in a treatment chair or on a treatment table. These arrangements of console units include the extremely commercially successful behind-the-patient dental console described and illustrated in U.S. Pat. No. 3,524,256, issued Aug. 18, 1970, and assigned to the assignee of the present invention.

However, most of the previous arrangements of console units have been primarily designed for use by the dentist, doctor or other person primarily performing the treatment on a patient and secondarily been designed or arranged for use by the dental assistant or other assistant. Inasmuch as the position or location of the dental or other assistant is determined primarily by the position of the dentist or other person performing the primary treatment on the patient, these prior arrangements of console units have not provided the versatility and mobility necessary for easy access thereto by the assistant in the various positions the assistant must assume depending upon the position of the dentist or other person performing the primary treatment.

OBJECTS AND SUMMARY OF THE INVENTION

Accordingly, it is the object of this invention to provide a console unit, particularly for use by a dental or other assistant, which is adapted to carry powered handpiece instruments and to provide shelf, drawer, cabinet or the like storage space for miscellaneous hand tools, supplies and the like and working space utilized during the treating of a patient, and which overcomes the problems presented by previous console units and which is characterized by a mobile construction for easy access thereto.

By this invention, it has been found that the above objects may be accomplished by providing such apparatus, generally as follows.

A main cabinet portion is provided for containing support apparatus for the powered handpiece instruments and for providing storage space. An upper work surface portion is movably carried by the main cabinet portion and has an upper generally flat working surface area thereon. A powered handpiece instrument storage compartment is secured to and suspended from one side of the upper work surface portion for movement therewith and for removably carrying a plurality of powered handpiece instruments and attached operating flexible hose for easy removal and use. Means are provided which mount the upper working surface area for horizontal forward and return movement for positioning of the upper working surface area and the handpiece instrument storage compartment in desired proximity to a user positioned in front of the console unit. Means are provided for mounting the upper work surface portion on the main cabinet portion for vertical upward and return movement of the upper work surface portion and the handpiece instrument storage compartment for positioning thereof at desired elevations for easy access by the user.

Preferably, the console unit further includes a base portion for supporting the console on a floor or other surface and means mounting the main cabinet portion on the base portion for swiveling movement for positioning of the main cabinet portion, the upper work surface portion and the handpiece instrument storage compartment in desired swiveled positions for easy access by the user of the console unit.

The means mounting the upper working surface area and thus the powered handpiece instrument storage compartment for horizontal forward and return movement comprises trackway and slide means for manual movement thereof by the user of the console unit. The means mounting the upper work surface portion and thus the powered handpiece instrument storage compartment for vertical upward and return movement preferably includes selectively actuated, power operated, elevator means for providing powered movement thereof by the user of the console unit.

The upper work surface portion of the console unit may preferably include an upstanding control panel portion mounted on and extending across a rearward area of the upper work surface portion for containing control elements for the powered handpiece instruments and the like. Also, the console unit may include an auxiliary cabinet portion mounted on and extending upwardly from the upstanding control panel to provide further storage area to the console unit.

Thus, the console unit of this invention provides a very versatile console unit which is specifically designed for use by a dental or other assistant and which is characterized by a mobile construction providing numerous positioning of certain components thereof for easy access thereto by the assistant in the various positions assumed by the assistant during the treatment of a patient.

BRIEF DESCRIPTION OF THE DRAWINGS

Some of the objects and advantages of the invention having been stated, other objects and advantages will appear when taken in conjunction with the accompanying drawings, in which.

DESCRIPTION OF PREFERRED EMBODIMENT

Figure 1:
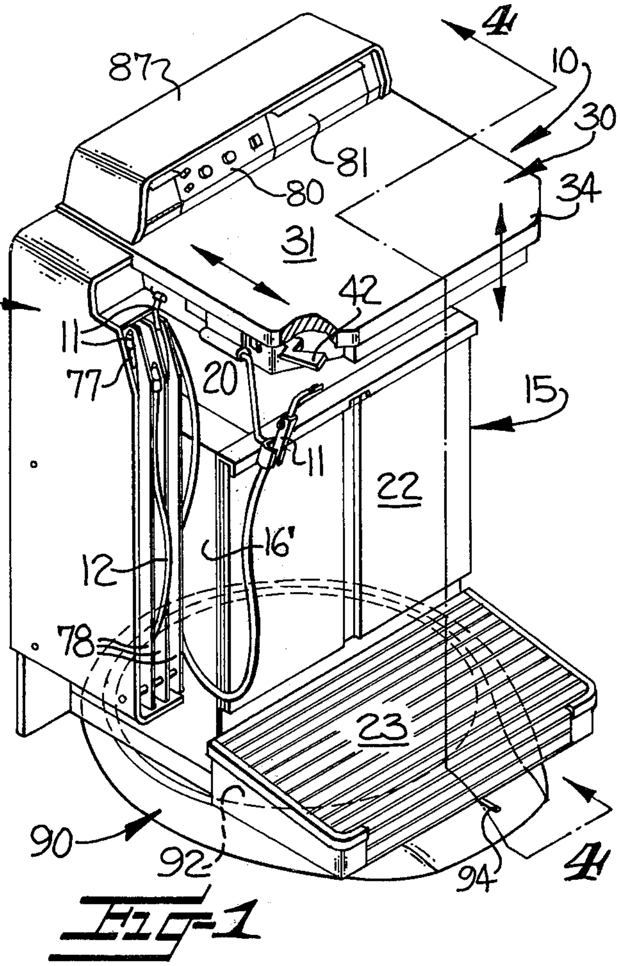
FIG. 1 is a perspective view of the console unit constructed in accordance with this invention.

Referring now to the drawings, the console unit is generally indicated by the reference numeral 10. This console unit 10 is particularly designed and constructed for use by a dental assistant in the treating of a patient and is adapted to carry powered handpiece instruments 11 and to provide shelf, drawer, cabinet or the like storage space for miscellaneous hand tools, supplies and the like (not shown) and provide working space utilized during the treating of a patient, as will be more fully described below. The console unit 10 is characterized by a mobile construction for easy access thereto, as will be more fully described below.

However, the console unit 10, while specifically designed and constructed for use by a dental assistant, would also have utility and could be used by others including medical assistants, dentists, doctors, and the like, who are involved in the treatment of a patient. The console unit 10 of this invention is particularly adaptable for use by a dental assistant in the treating of a patient positioned in a treatment chair in which the dental assistant's console unit 10 is positioned on one side of the treatment chair and the dentist who is performing the primary treatment is positioned on the other side of the treatment chair and has access to an over-the-patient console unit, as illustrated and described in U.S. Pat. application Ser. No. 741,381, filed concurrently herewith and assigned to the assignee of the present invention.

Figure 4:
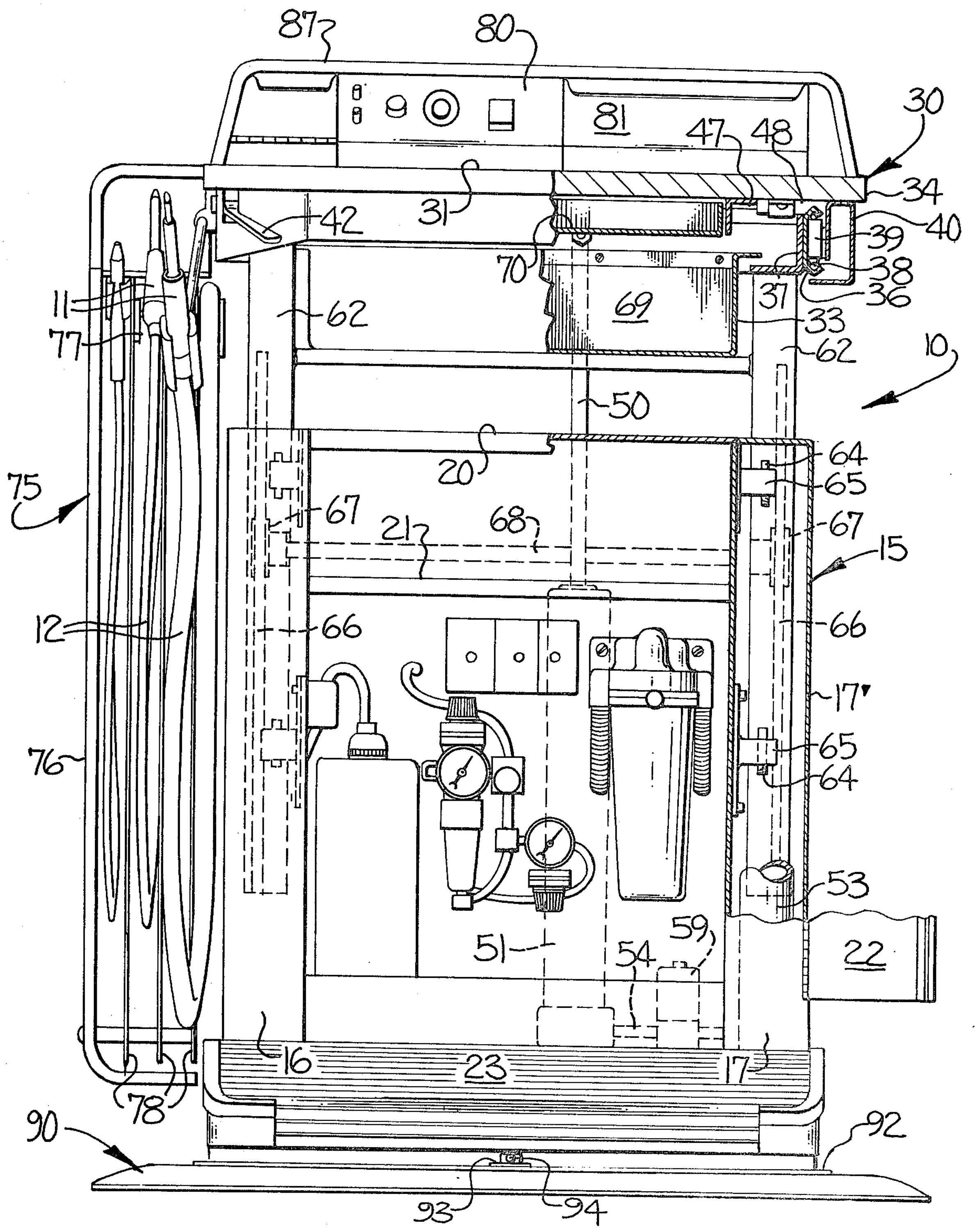
FIG. 4 is a front elevational view, partly in section, and taken generally along the line 4—4 of FIG. 1.

As illustrated in the drawings, the console unit 10 includes a main cabinet portion 15 for containing support apparatus, such as valving, plumbing, gauges, etc., as shown in FIG. 4, for the powered handpiece instruments 11. The main cabinet portion 15 also provides storage space therein.

As shown particularly in FIG. 3, the main cabinet portion 15 includes side sections 16, 17 providing hollow interiors which are covered by outside cover plates 16', 17', for purposes to be described below. The main cabinet portion 15 further includes a rear cover plate 18, a bottom 19 and a top 20 to define an opened front, generally hollow interior for containing the support apparatus, mentioned above, for the powered handpiece instruments 11, as shown in FIG. 4. The interior of the main cabinet portion 15 may also include a shelf 21 for providing shelf storage space therein and the front is closed by a pivotally mounted door 22. The main cabinet portion 15 may further include a footrest, stabilizing portion 23 attached to the front thereof for providing additional stability thereto, when other parts of the console unit 10 are moved forwardly in a manner to be described below.

The console unit 10 further includes an upper work surface portion 30 movably carried by the main cabinet portion 15 and having an upper generally flat working surface area 31 thereon. The upper work surface portion 30 includes a horizontally stationary portion 33 and a horizontally movable portion 34 which includes the upper generally flat working surface area 31 thereon. This working surface area 31 may be used by the dental assistant for performing tasks adjacent to the treating area of the patient which require a desk top or table top type of flat working surface, such as the mixing of materials, laying out of supplies and hand tools, etc.

Figure 5:
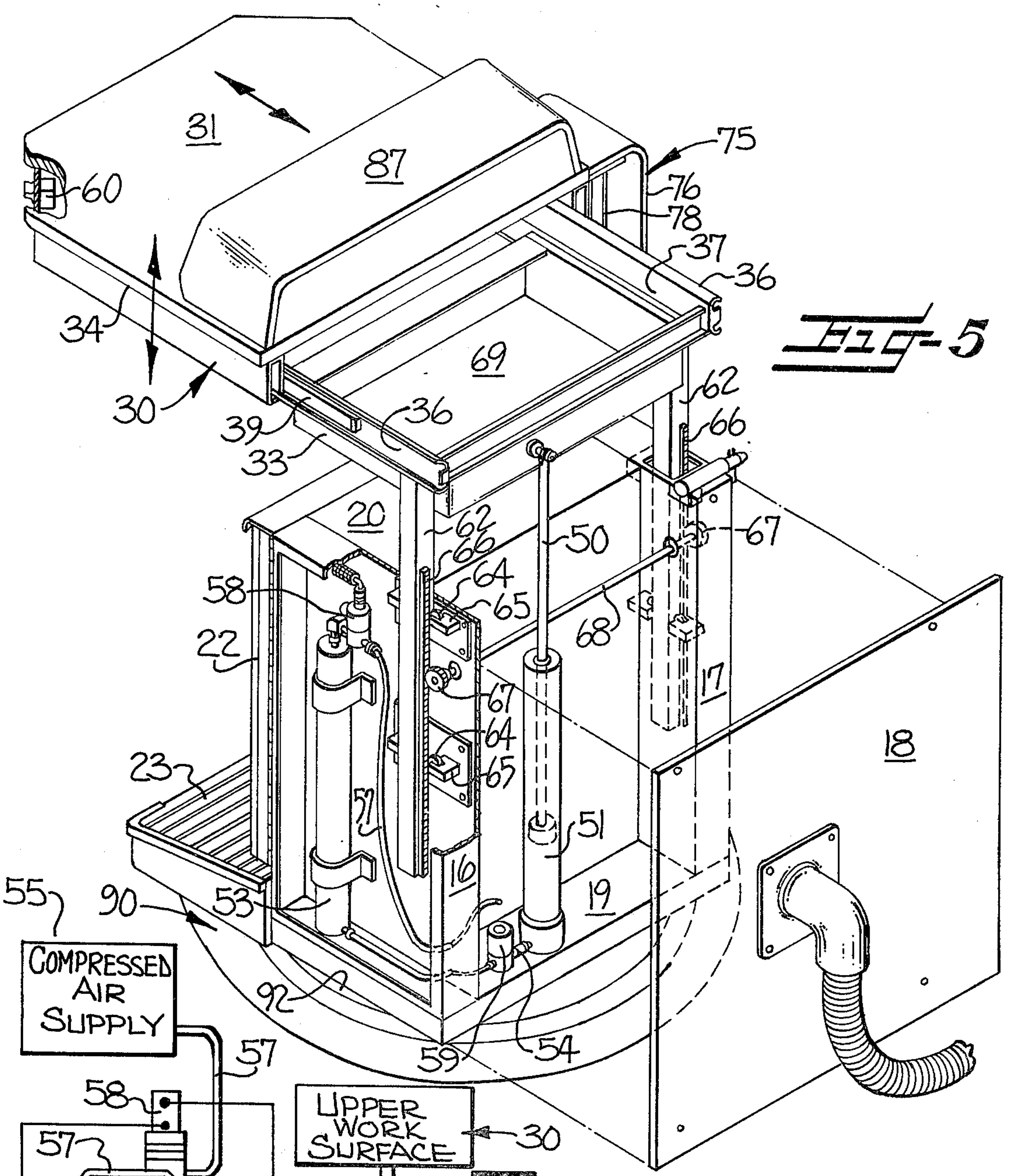
FIG. 5 is a perspective view of the console unit of FIG. 1, taken from the rear, with the upper work surface portion moved to a horizontally forward position and with portions removed for illustration of internal components.

The console unit 10 further includes mating trackway and slide means respectively secured to and mounting the horizontally movable portion 34 on the horizontally stationary portion 33 of the upper work surface portion 30 for manual horizontal forward and return movement for positioning of the upper work surface area 31 in desired proximity to a user of the console unit 10 positioned in front of the console unit. As shown particularly in FIGs. 3 and 4, this mating trackway and slide means comprises generally C-shaped tracks 36 secured to angle brackets 37 which are in turn secured to the sides of the horizontally stationary portion 33. These track members 36 receive ball bearings 38 therein, as shown in FIG. 4, which in turn receive an elongate slide member 39 therebetween which is secured to the inside of downwardly extending flange members 40 carried by the horizontally movable portion 34. This track and slide arrangement, as shown in cross section in FIG. 4, is present on each side of the horizontally movable portion 34 and the horizontally stationary portion 33 so that the horizontally movable portion 34 may be manually moved forwardly, as shown in FIG. 5, to a desired forward position and returned.

Figure 7:
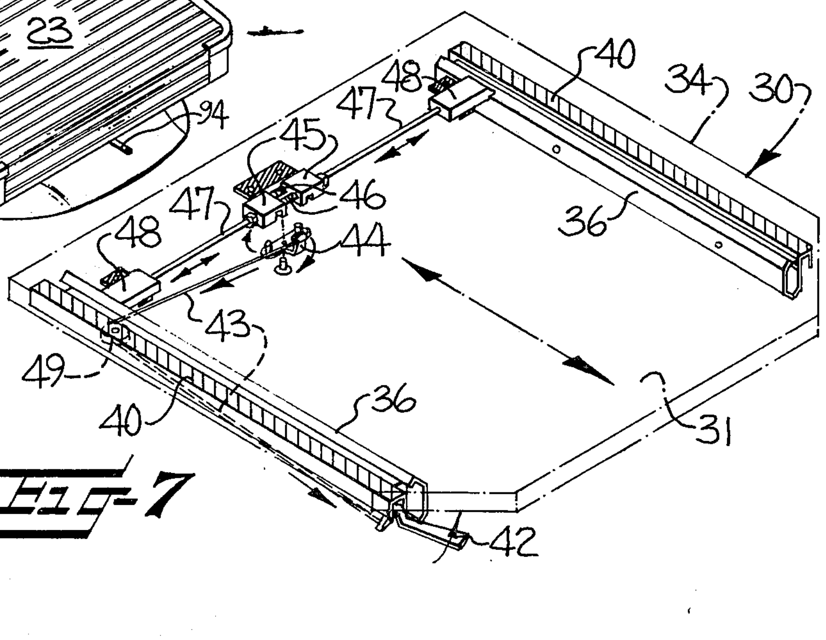
FIG. 7 is a perspective detail of the brake device utilized with the mechanisms mounting the upper work surface area of the console unit for horizontal forward and return movement.

This trackway and slide mounting means further includes a brake device, as illustrated in FIG. 7, for manual release by the user of the console unit when forward or return movement of the horizontally movable portion 34 is desired and for manual engagement by the user of the console unit 10 for holding the horizontally movable portion 34 thereof in the desired position. This brake device, as shown in FIG. 7, may include a pivotally mounted lever member 42 suitably mounted on the horizontally stationary portion 33 and having a free handle end for engagement by the user and a cable 43 attached to the other end thereof which passes around a pulley 49 and leads to a pivotally mounted member 44 which has upstanding pins engaging in slides within block members 45. The block members 45 are spring biased apart by springs 46 and include shaft members 47 extending outwardly therefrom to friction brake members 48. The block members 45 are secured to the underside of the horizontally movable portion 34.

When the hand operated lever 42 is unengaged by the user, the block members 45 will be biased apart to place the friction brake members 48 into frictional engagement with the insides of the tracks 36 secured to the horizontally stationary portion 33 to hold the movable portion 34 against horizontal movement by the friction engagement. When the user desires to horizontally move the horizontally movable portion 34, the lever 42 will be pivoted to place a tension on the cable 42, pivot the member 44 to move the block members 45 toward each other against the bias of the springs 46 and thus move the brake members 48 out of frictional engagement with the tracks 36. This will allow the horizontally movable portion 34 to be freely moved horizontally forwardly and rearwardly by the user. The lever 42 may then be released and the friction brake members 48 will again be engaged to hold the horizontally movable portion 34 in the desired position. The frictional contact between the brake members 48 and the tracks 36 is such that the user may horizontally move the movable portion 34 while the brake members 48 are in engagement with the tracks 36.

Figure 6:
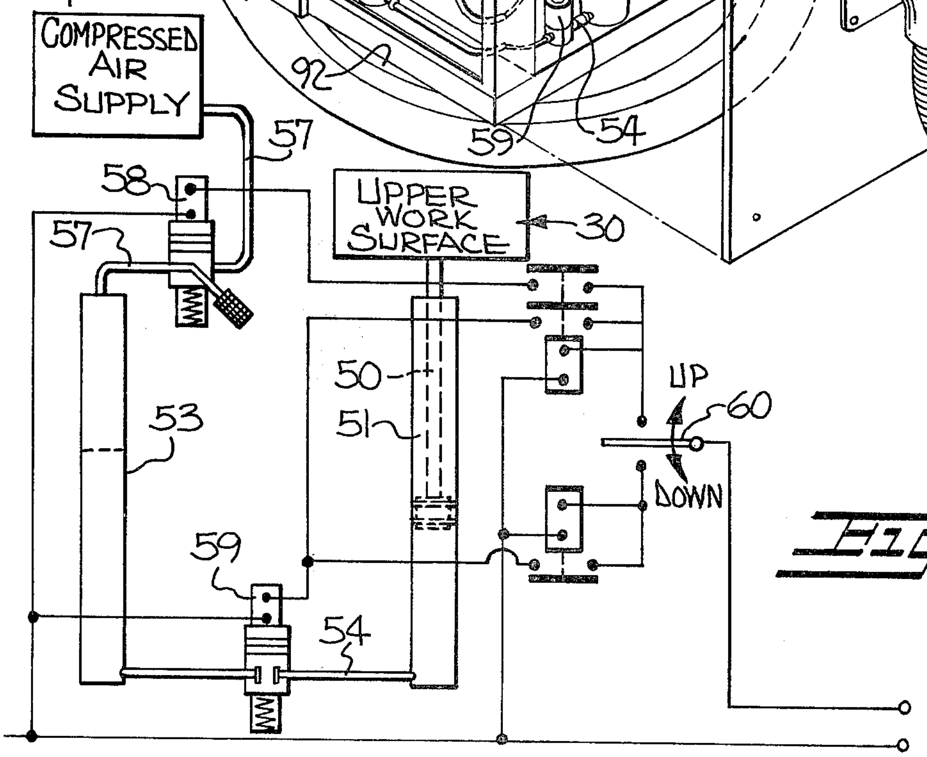
FIG. 6 is a schematic view of the preferred power operated elevator means utilized for vertical upward and return movement of the upper work surface portion of the console unit.

The console unit 10 further includes means mounting the upper work surface portion 30 on the main cabinet portion 15 for vertical upward and return movement and includes selectively actuated, power operated, elevator means, shown schematically in FIG. 6, for providing powered movement thereof by the user of the console unit 10 for positioning of the upper work surface portion 30 and particularly the upper work surface area 31 at a desired elevation for easy access by the user. This is particularly important when it is considered that a dental assistant often either works from a standing position or is seated on a stool which would require the positioning of the work surface area 31 at different elevations for convenient access thereto.

The elevator means for performing the above described vertical movement of the upper work surface portion 30 includes a hydraulically operated piston and cylinder mechanism 50, 51 in which the cylinder 51 is secured to the bottom 19 of the main cabinet portion 15 and the piston 50 is secured to the back of the horizontally stationary portion 33 of the upper work surface portion 30, as may be seen particularly in FIG. 5. The elevator means further includes a container of hydraulic fluid 53, which may be positioned in one of the hollow areas of the side portion 16 of the main cabinet portion 15, as shown in FIG. 5, and includes a conduit 54 leading from the bottom thereof to the piston side of the cylinder 51, as shown in FIGS. 5 and 6.

The elevator mechanism includes control means for selective operation by the user of the console unit 10 (1) for causing the flow of hydraulic fluid into the piston and cylinder mechanism 50, 51 to cause respective movement therebetween to positively raise the upper work surface portion 30 to a desired vertical position, (2) for stopping the flow of hydraulic fluid from the container 53 into the piston and cylinder mechanism 50, 51 to hold the upper work surface portion 30 in the desired raised position, and (3) for allowing the hydraulic fluid to flow out of the piston and cylinder mechanism 50, 51 to lower the upper work surface portion 30 under the influence of gravity on the upper work surface portion 30 and piston 50.

As shown in FIGS. 5 and 6, this control means comprises a source of compressed air 55, shown schematically in FIG. 6, including a conduit 57 leading to the top of the container 53 of hydraulic fluid. The control means further includes an electrical, solenoid operated, valve 58 positioned in the compressed air conduit 57 and an electrical, solenoid operated, valve 59 positioned in the hydraulic fluid conduit 54. The control means further includes an electric circuit, shown schematically in FIG. 6, connected with each of the solenoid operated valves 58, 59 and including a manually operated, three position, switch 60 for being selectively manually operated (1) to open each of the valves 58, 59 to allow the flow of compressed air into the top of the container 53 of hydraulic fluid to force the fluid out of the bottom of the container 53, through the conduit 54 and valve 59 and into the piston side of the cylinder 51 for moving the piston 50 upwardly and thus the upper work surface portion 30 of the console unit 10 for the raising movement thereof, (2) to close each of the valves 58, 59 to shut off the flow of compressed air into the hydraulic fluid container 53 and to stop the flow of hydraulic fluid through the valve 59 which will hold the hydraulic fluid within the cylinder 51 and thus hold the piston 50 and upper work surface portion 30 in its desired position, and (3) to open the hydraulic fluid valve 59 only to allow the flow of hydraulic fluid from the cylinder 51 back into the container 53 under the force of gravity acting on the upper work surface portion 30 and piston 51 to move downwardly and force the hydraulic fluid out of the cylinder 51. Air is pushed out of the container 53 as the fluid flows back into the container and is vented through the valve 58, in its closed position, as may be seen in FIG. 6.

The operation of the electric circuit and switch 60 for operation of the solenoid operated valves 58, 59 is believed to be clear from the schematic illustration of FIG. 6 and further explanation herein is not deemed necessary.

Figure 3:
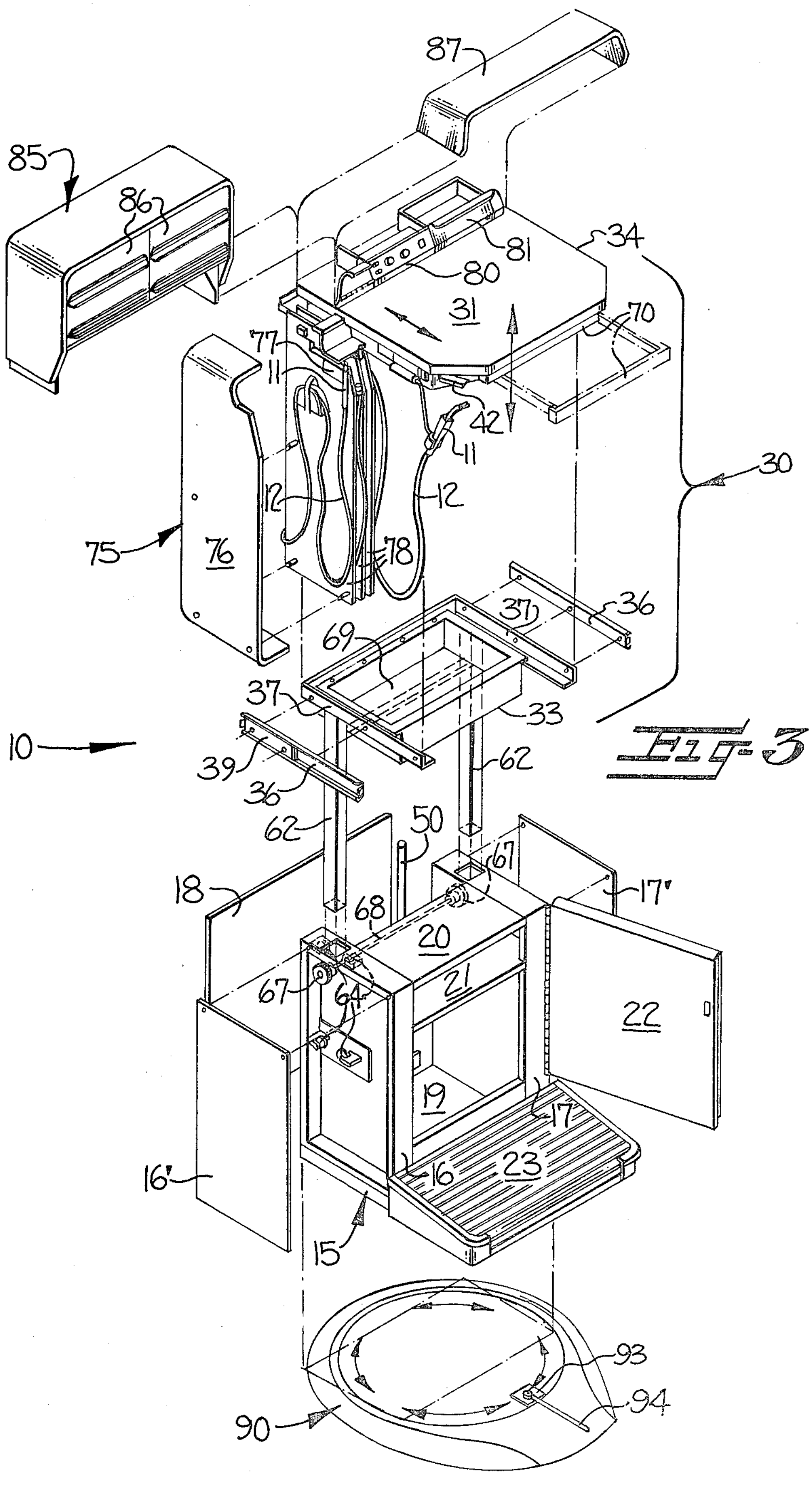
FIG. 3 is an exploded view of the console unit of FIGS. 1 and 2.

The means mounting the upper work surface portion 30 for vertical upward and return movement on the main cabinet portion 15 further includes a pair of post members 62 secured to and extending downwardly from generally opposite sides of the horizontally stationary portion 33 of the upper work surface portion 30 at generally the rear thereof, as shown particularly in FIGS. 3, 4 and 5. Stabilizing and bearing means are secured to generally opposite sides of the main cabinet portion 15 for receiving the post members 62 therein and for allowing upward and return movement of the post members 62 with the upper work surface portion 30 while providing cooperating vertical stabilization for said post members 62. These stabilizing and bearing means may be in the form of rollers 64 carried by brackets 65 secured to the inside of side portions 16 of the main cabinet portion 15.

There is further provided a rack gear 66 secured to the outside of each of the post members 62 and mating with pinion gears 67 carried on opposite ends of a shaft 68 passing through and carried by the side portions 16 of the main cabinet portion 15 for commonly mounting the pinion gears 67 for free rotation. Thus, as the upper work surface portion 30 moves vertically upwardly and downwardly, the pinion gear 67 will rotate along the rack gears 66 for maintaining the upper work surface portion 30 and particularly the upper work surface area 31 in a generally horizontal attitude during the vertical movement.

As may be seen particularly in FIG. 5, the horizontally stationary portion 33 of the upper work surface portion 30 comprises an open top, hollow interior construction for providing a storage area 69 therewithin in which access thereto may be obtained when the horizontally movable portion 34 occupies a forward position. Additionally, a drawer 70 may be positioned within the front of the horizontally movable portion 34 of the upper work surface portion 30 for providing drawer storage space therein.

The console unit 10 further includes a powered handpiece instrument storage compartment 75 comprising an elongate, generally vertically extending, compartment having an open front and being secured at generally the upper end thereof to one side of the upper work surface portion 30 for forward, upward and return movements therewith and is suspended therefrom to extend downwardly alongside the main cabinet portion 15 and defines a hollow interior therewithin for at least partially removably containing the powered handpiece instruments 11 and elongate operating flexible hose 12 attached thereto and disposed in a generally downwardly extending U-shaped configuration for easy removal and use thereof in a manner well understood by those with ordinary skill in the art.

This powered handpiece instrument storage compartment 75 includes an outer cover plate 76, an instrument holding bracket member 77 and vertically extending partitions 78 positioned within the hollow interior for providing separate chambers for the flexible hose 11 to prevent entanglement thereof. The above components of the instrument storage compartment 75 are all suitably attached together and secured at the upper end thereof to the side of the horizontally movable portion 34 of the upper work surface portion 30 for forward, upward and return movement therewith for conveniently placing the powered handpiece instruments at a desired forward and elevated position for easy access and use by the dental assistant. The operating hose 12 may be suitably connected with the support apparatus contained within the main cabinet portion 15.

The upper work surface portion 30 may further include an upstanding control panel portion 80 mounted on and extending across the horizontally movable portion 34 rearwardly of the upper working surface area 31. This control panel portion 80 may include suitable controls and instrumentation therein for controlling the powered handpiece instruments 11 and other devices utilized with the console unit 10. This control panel portion 80 may also include suitable storage compartments 81 having door or drawer fronts thereon for access to the interiors thereof.

Figure 2:
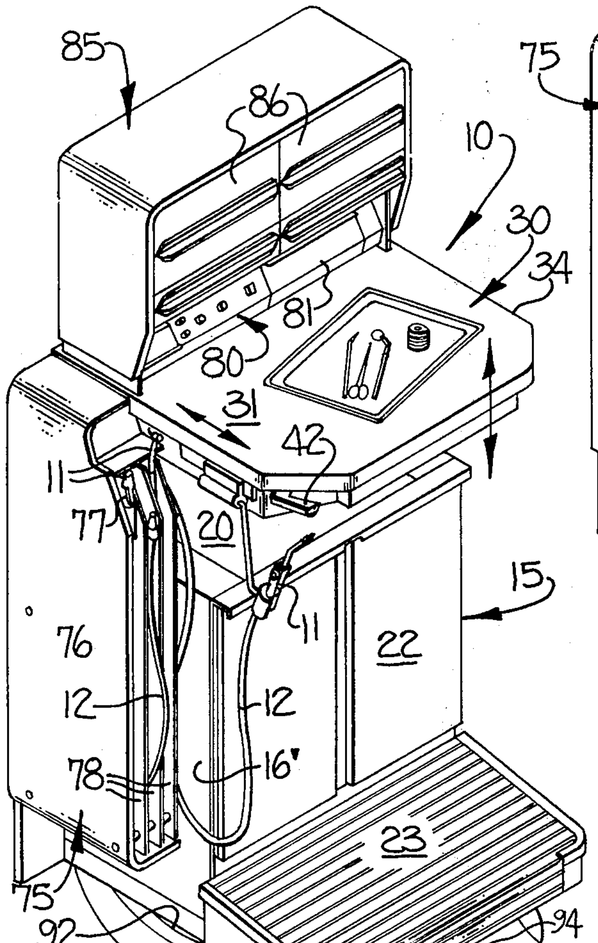
FIG. 2 is a perspective view, like FIG. 1, with the addition thereto of an auxiliary cabinet portion.

The console unit 10 may further include, as illustrated in FIG. 2, an auxiliary cabinet portion 85 which may be mounted on the control panel portion 80 to extend upwardly therefrom and provide further storage area to the console unit 10. This auxiliary cabinet portion 85 may also include compartments 86 therein having cabinet door to drawer fronts thereon for obtaining access to the interiors of the compartments. When the auxiliary cabinet portion 85 is utilized, it would be mounted directly over the control panel portion 80 to provide a top cover therefor. However, if this auxiliary cabinet portion 85 is not utilized, as shown in FIG. 1, a top cover plate 87 would be utilized for covering the top of the upstanding control panel 80.

The console unit 10 may further include a base portion 90 for supporting the console unit 10 on a floor or other surface and means mounting the main cabinet portion 15 on the base portion 90 for swiveling movement for positioning of the main cabinet portion 15, the upper work surface portion 30 and the handpiece instrument storage compartment 75 in desired swiveled positions for easy access by the user of the console unit. As shown particularly in FIG. 3, this means for mounting the main cabinet portion 15 on the base portion 90 comprises a disc member 92 rotatably mounted within a recess in the base portion 90 for free rotative movement with respect thereto. The main cabinet portion 15 would be mounted on this rotary disc member 92 in any convenient manner. There may also be provided a friction brake device 93 including a foot operated lever 94 and mounted on the rotating disc member 92 for frictionally engaging the side of the recess within the base member 90 to hold the console unit 10 in a desired swiveled position.

It may be seen that the console unit of this invention has provided a versatile and movable construction along with providing shelf, drawer, cabinet or the like storage space and working space for easy access by the user.

In the drawings and specification there has been set forth a preferred embodiment of this invention and, although specific terms have been employed, they are used in a generic and descriptive sense only and not for purposes of limitation.

What is claimed is:

1. A console unit, particularly for use by a dental assistant adapted to carry powered handpiece instruments and to provide shelf, drawer, cabinet or the like storage space for miscellaneous hand tools, supplies and the like and working space utilized during the treating of a patient, and being characterized by a mobile independently adjustable construction for easy access thereto, said console unit comprising:

a main cabinet portion for containing support apparatus for the powered handpiece instruments and for providing storage space;

an upper work surface portion separately vertically and horizontally movably carried by said main cabinent portion and having an upper generally flat working surface area thereon;

a powered handpiece instrument storage compartment secured to and suspended from one side of said upper work surface portion for movement therewith and for removably carrying a plurality of the powered handpiece instruments and attached operating flexible hose for easy removal and use;

means mounting said upper working surface area for independent horizontal forward and return movement regardless of the vertical position thereof for positioning of said upper working surface area and said handpiece instrument storage compartment in desired proximity to a user positioned in front of said console unit; and separate means mounting said upper work surface portion on said main cabinet portion for independent vertical upward and return movement of said upper work surface portion and said handpiece instument storage compartment regardless of the horizontal position thereof for positioning thereof at a desired elevation for easy access by the user.

2. A console unit, as set forth in claim 1, in which said powered handpiece instrument storage compartment comprises an elongate, generally vertically extending compartment having an open front and being secured at generally the upper end thereof to one side of said upper work surface portion for forward, upward and return movements therewith and extending downwardly alongside said main cabinet portion and defining a hollow interior for at least partially removably containing the powdered handpiece instruments and the operating flexible hose attached thereto in a generally downwardly extending U-shaped configuration, said compartment further including vertically extending partitions within said hollow interior separating the flexible hose to prevent entanglement thereof.

3. A console unit, as set forth in claim 1, in which said means mounting said upper working surface area and thus said powered handpiece instrument storage compartment for horizontal forward and return movement comprises trackway and slide means for manual movement thereof by the user of said console unit.

4. A console unit, as set forth in claim 3, in which said mounting means further includes brake means operatively associated with said trackway and slide means for manual release by the user of said console unit when forward or return movement of said upper working surface area and said instrument storage compartment is desired and for manual engagement by the user of said console unit for holding said upper working surface area and said instrument storage compartment in the desired position.

5. A console unit, as set forth in claim 1, in which said upper work surface portion comprises a horizontally stationary portion carried by said main cabinet portion and a horizontally movable portion having said upper generaly flat working surface area thereon, and said means mounting said upper working surface area for horizontal forward and return movement comprises mating trackway and slide means respectively secured to and mounting said horizontally movable portion on said horizontally stationary portion for manual horizontal forward and return movement of said movable portion.

6. A console unit, as set forth in claim 5, in which said horizontally stationary portion of said upper work surface portion comprises an open top, hollow interior construction for providing storage area therewithin in which access thereto may be obtained when said horizontally movable portion occupies a forward position.

7. A console unit, as set forth in claim 5, in which said upper work surface portion further includes an upstanding control panel portion mounted on and extending across said horizontally movable portion rearwardly of upper working surface area for containing control elements for the powered handpiece instruments and the like.

8. A console unit, as set forth in claim 7, in which said console unit further includes an auxiliary cabinet portion mounted on and extending upwardly from said upstanding control panel to provide further storage area to said console unit.

9. A console unit, as set forth in claim 1, in which said means mounting said upper work surface portion and thus said powered handpiece instrument storage compartment for vertical upward and return movement includes selectively actuated, power operated elevator means for providing powered movement thereof by the user of said console unit.

10. A console unit, as set forth in claim 9, in which said elevator means comprises a hydraulically operated piston and cylinder mechanism connected respectively between said main cabinet portion and said upper work surface portion, a container of hydraulic fluid including conduit means leading to said piston and cylinder mechanism, and control means for selective operation by the user of said console unit (1) for causing the flow of hydraulic fluid into said piston and cylinder mechanism to cause respective movement therebetween to positively raise said upper work surface portion to a desired position, (2) for stopping the flow of hydraulic fluid into said piston and cylinder mechanism to hold said upper work surface portion in the desired raised position, and (3) for allowing the hydraulic fluid to flow out of said piston and cylinder mechanism to lower said upper work surface portion under the influence of gravity thereon.

11. A console unit, as set forth in claim 10, in which said control means comprises a source of compressed air including a conduit leading to said container of hydraulic fluid, electrically operated valve means positioned in said compressed air conduit, electrically operated valve means positioned in said hydraulic fluid conduit, and electric circuit means connected with each of said valve means and including manually operated switch means for being manually selectively operated (1) to open each of said valve means to allow the flow of compressed air into said container of hydraulic fluid to force the fluid out of said container and into said piston and cylinder mechanism for the raising movement, (2) to close each of said valve means for the holding action, and (3) to open said hydraulic fluid valve means to allow the flow of hydraulic fluid from said piston and cylinder mechanism into said hydraulic fluid container for the lowering movement.

12. A console unit, as set forth in claim 10, in which said means mounting said upper work surface portion for vertical upward and return movement further includes post means secured to and extending downwardly from generally opposite sides of said upper work surface portion, stabilizing and bearing means secured to generally opposite sides of said main cabinet portion for receiving said post means therein and for allowing upward and return movement of said post means relative thereto while providing cooperating vertical stabilization for said post means, rack gear means secured to each of said post means, and pinion gear means commonly mounted on said main cabinet means for free common rotation and respectively engaging said rack gear means for cooperating therewith for maintaining said upper work surface portion in a generally horizontal attitude during the vertical movement thereof.

13. A console unit, as set forth in claim 1, in which said console unit further includes a base portion for supporting said console unit on a floor or other surface, and means mounting said main cabinet portion on said base portion for swiveling movement for positioning of said main cabinent portion, said upper work surface portion and said handpiece instrument storage compartment in desired swiveled positions for easy access by the user of said console unit.

14. A console unit, particularly for use by a dental assistant, adapted to carry powered handpiece instruments and to provide shelf, drawer, cabinet, or the like storage space for miscellaneous hand tools, supplies and the like and working space utilized during the treating of a patient, and being characterized by a mobile construction for easy access thereto, said console unit comprising:

a main cabinet portion for containing support apparatus for the powered handpiece instruments and for providing storage space;

an upper work surface portion separately vertically and horizontally movably carried by said main cabinet portion and comprising a horizontally stationary portion and a horizontally movable portion, said horizontally movable portion having an upper generally flat working surface area thereon;

means comprising mating trackway and slide means respectively secured to and mounting said horizontally movable portion on said horizontally stationary portion of said upper work surface portion for independent manual horizontal forward and return movement regardless of the vertical position thereof for positioning of said upper working surface area in desired proximity to a user of said console unit positioned in front of said console unit;

separate means mounting said upper work surface portion on said main cabinet portion for independent vertical upward and return movement regardless of the horizontal position thereof and including selectively actuated, power operated, elevator means for providing powered movement thereof by the user of said console unit for positioning of said upper work surface portion at a desired elevation for easy access by the user; and a powered handpiece instrument storage compartment comprising an elongate, generally vertically extending compartment having an open front and being secured at generally the upper end thereof to one side of said upper work surface portion for forward, upward and return movements therewith and being suspended therefrom to extend downwardly alongside said main cabinet portion and defining a hollow interior therein for at least partially removably containing the powered handpiece instruments and elongate operating flexible hose attached thereto and disposed in a generally downwardly extending U-shaped configuration for easy removal and use thereof.

15. A console unit, as set forth in claim 14, in which said elevator means comprises a hydraulically operated piston and cylinder mechanism connected respectively between said main cabinent portion and said upper work surface portion, a container of hydraulic fluid including conduit means leading to said piston and cylinder mechanism, and control means for selective operation by the user of said console unit (1) for causing the flow of hydraulic fluid into said piston and cylinder mechanism to cause respective movement therebetween to positively raise said upper work surface portion to a desired position, (2) for stopping the flow of hydraulic fluid into said piston and cylinder mechanism to hold said upper work surface portion in the desired raised position, and (3) for allowing the hydrauic fluid to flow out of said piston and cylinder mechanism to lower said upper work surface portion under the influence of gravity thereon.

16. A console unit, as set forth in claim 15, in which said control means comprises a source of compressed air including a conduit leading to said container of hydraulic fluid, electrically operated valve means positioned in said compressed air conduit, electrically operated valve means positioned in said hydraulic fluid conduit, and electric circuit means connected with each of said valve means and including manually operated switch means for being selectively manually operated (1) to open each of said valve means to allow the flow of compressed air into said container of hydraulic fluid to force the fluid out of said container and into said piston and cylinder mechanism for the raising movement, (2) to close each of said valve means for the holding operation, and (3) to open said hydraulic fluid valve means to allow the flow of hydraulic fluid from said piston and cylinder mechanism into said hydraulic fluid container for the lowering movement.

17. A console unit, as set forth in claim 16, in which said means mounting said upper working surface portion for vertical upward and return movement further includes post means secured to and extending downwardly from generally opposite sides of said upper work surface portion, stabilizing and bearing means secured to generally opposite sides of said main cabinet portion for receiving said post means therein and for allowing upward and return movement of said post means relative thereto while providing cooperating vertical stabilization for said post means, rack means secured to each of said post means, and, pinion gear means commonly mounted on said main cabinet means for free common rotation and respectively engaging said rack gear means for cooperating therewith for maintaining said upper work surface portion in a generally horizontal attitude during the vertical movement thereof.

18. A console unit, as set forth in claim 14, in which said upper work surface portion further includes an upstanding control panel portion mounted on and extending across said horizontally movable portion rearwardly of said upper work surface area for containing control elements for the powered handpiece instruments and the like.

19. A console unit, as set forth in claim 18, in which said console unit further includes an auxiliary cabinet portion mounted on and extending upwardly from said upstanding control panel to provide further storage area to said console unit.

20. A console unit, as set forth in claim 19, in which said main cabinet portion includes an open front, pivotally mounted door means for movement to open and close said open front, and shelf means disposed therewithin for providing shelf and cabinet storage space, said horizontally stationary portion of said upper work surface portion comprising an open top, hollow interior construction for providing storage area therewithin in which access thereto may be obtained with said horizontally movable portion occupies a forward position, said horizontally movable portion of said upper work surface portion including drawer means disposed therewithin for providing drawer storage space, said control panel portion having storage means therein for providing additional storage space.

21. A console unit, as set forth in claim 14, in which said mounting means further includes brake means operatively associated with said trackway and slide means for manual release by the user of said console unit when forward or return movement of said horizontally movable portion thereof is desired and for manual engagement by the user of said console unit for holding said horizontally movable portion thereof in the desired position.

22. A console unit, as set forth in claim 14, in which said console unit further includes a base portion for supporting said console unit on a floor or other surface, and means mounting said main cabinet portion on said base portion for swiveling movement for positioning of said main cabinet portion, said upper work surface portion and said handpiece instrument storage compartment in desired swiveled positions for easy access by the user of said console unit.

* * * * *